United States Patent [19]

Wedlake et al.

[11] 4,187,083

[45] Feb. 5, 1980

[54] HARD MATERIALS OF BCN IN TETRAHEDRAL FORM AND METHOD OF MAKING IT

[76] Inventors: Roger J. Wedlake, 289 Lister Rd., Rembrandt Park, Johannesburg, Transvaal; Anthony L. Penny, 16 High Rise, Primrose Ter., Berea, Johannesburg, Transvaal, both of South Africa

[21] Appl. No.: 878,472

[22] Filed: Feb. 16, 1978

[30] Foreign Application Priority Data

Feb. 16, 1977 [ZA] South Africa .................. 77/0925

[51] Int. Cl.² .................. C01B 35/14; C04B 31/16
[52] U.S. Cl. .................. 51/307; 423/276; 423/371
[58] Field of Search .................. 51/307; 423/371, 276, 423/282; 106/56

[56] References Cited

U.S. PATENT DOCUMENTS

| | | | |
|---|---|---|---|
| 1,129,508 | 2/1915 | Peacock | 423/276 |
| 2,941,252 | 6/1960 | Bovenkerk | 425/77 |
| 3,488,153 | 1/1970 | Bundy | 423/446 |
| 3,637,320 | 1/1972 | Wakefield et al. | 423/371 |
| 3,850,591 | 11/1974 | Wentorf | 51/307 |
| 3,944,398 | 3/1976 | Bell | 51/307 |

FOREIGN PATENT DOCUMENTS

2806070  8/1978  Fed. Rep. of Germany .......... 423/276

Primary Examiner—Donald J. Arnold
Attorney, Agent, or Firm—Cushman, Darby & Cushman

[57] ABSTRACT

This invention relates to a novel hard material which may be used as an abrasive and a method of making the material. The material consists essentially of $B_xC_yN_z$, wherein x, y and z can have any value greater than 1, in tetrahedral form. The preferred material is BCN. The material is made by subjecting an appropriate source of boron, nitrogen and carbon to conditions of temperature and pressure sufficient to produce the material. The preferred method is to subject boron carbonitride in hexagonal or amorphous form in the presence of an appropriate solvent for the substance such as an aluminium/iron alloy to a pressure exceeding 50 kilobars and simultaneously a temperature exceeding 1300° C.

12 Claims, 1 Drawing Figure

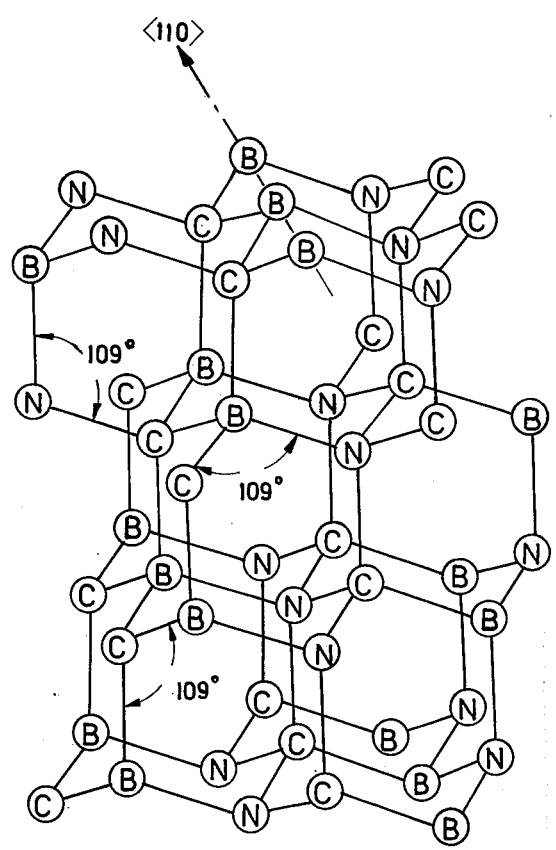

HARD MATERIALS OF BCN IN TETRAHEDRAL FORM AND METHOD OF MAKING IT

This invention relates to hard materials. Many hard materials are known and used extensively in industry as abrasives. Examples of hard materials are diamond, cubic boron nitride, silicon carbide, tungsten carbide and boron carbide. Diamond and cubic boron nitride are the hardest known substances.

It is an object of the present invention to provide a novel hard material which can be used as an abrasive and a method of making such a material.

A hard material according to the invention consists essentially of $B_xC_yN_z$, wherein x, y and z can have any value greater than or equal to 1, in tetrahedral form. The term "tetrahedral" means each atom in the material is tetrahedrally bonded to four nearest neighbours so as to form a three dimensional structure. The hard material of the invention consists essentially of boron, carbon and nitrogen in the relationship defined above. In other words the material may contain a small quantity of impurity.

In the hard material, the various ratios x:y, x:z, and y:z will generally not exceed 2:1 and vice versa. In one example of the material x is equal to z and not equal to y.

A typical and preferred example of the material is that in which x, y and z are all equal to 1. This is the material BCN in tetrahedral form and is illustrated diagrammatically in its ideal form in the attached drawing. The angle between the various tetrahedral bonds is 109°. The atoms of B, C and N lie substantially in rows parallel to the <110> crystallographic direction. Each atom of a particular species is only bonded to atoms of the other two species, i.e. no B—B, C—C and N—N bonds should be present in the ideal structure. Stacking faults in the structure could result in some B—B, C—C or N—N bonds being present.

The hard material of the invention, particularly the preferred material BCN, has a hardness comparable to that of diamond and cubic boron nitride. The material will scratch cubic boron nitride and the soft direction of diamond and has a Knoop hardness between 4050 and 9000 kg/mm². The material is an insulator in its pure state.

The hard material is produced in the form of discreet particles or in polycrystalline form by methods which are described hereinafter.

The material is an abrasive and as such can be used in abrasive devices such as grinding wheels, saws and abrasive compacts.

The invention further provides a method of making the new hard material. This method includes the step of subjecting an appropriate source of boron, nitrogen and carbon to conditions of temperature and pressure sufficient to produce the material.

In one form, the method involves subjecting boron carbonitride in hexagonal (graphitic) or amorphous form, in the presence of a solvent for the boron carbonitride to elevated conditions of pressure and temperature, the pressure exceeding 50 kilobars and the temperature exceeding 1300° C. The pressure used will generally not exceed 100 kilobars and the temperature will generally not exceed 2000° C. These elevated conditions of temperature and pressure are maintained for a period sufficient to produce the material. In general, this period will be about 10 to 60 minutes.

The solvent for the boron carbonitride must be capable of wetting and dissolving the substance under the conditions of elevated temperature and pressure which are used. A suitable solvent is a mixture or alloy of a metal of Group 8 of the Periodic Table and aluminium. The Group 8 metal is preferably cobalt, nickel or iron. The ratio of Group 8 metal to aluminium will typically be in the range 15:1 to 1:15 on a weight basis.

The boron carbonitride may be produced by methods known in the art such as nitriding boron and carbon black in a nitrogen atmosphere at temperatures of 1800° to 2000° C. Examples of articles in this regard, which are incorporated herein by reference, are:

1. Poroshkovaya Metallurgiya, No. 1 (97), pages 27–33, January, 1971.
2. Proc. Int. Conf. Chemical Vapour Deposition, 3rd, 1972.

The synthesis of the hard material is carried out in a suitable high temperature/pressure apparatus such as the so-called "belt" apparatus which forms the subject of U.S. Pat. No. 2,941,248. This apparatus consists essentially of an annular belt or die member having a tapering aperture therethrough and a pair concentric frustoconical punches which are capable of moving into the aperture to define a reaction chamber therein. A suitable gasket material such as pyrophyllite is employed between the punches and die member for sealing purposes and over the inner surface of the die facing the reaction zone to insulate thermally this portion of the die. The temperature of the reaction chamber may be raised by connecting the punch members to a source of electrical power thereby creating a resistance heating circuit through the punches and the reactant materials in the reaction chambers.

The boron carbonitride and solvent medium are generally charged to the reaction chamber in the form of a powdered mixture. Small crystals of the hard material dispersed in the solvent medium are produced. The crystals are recovered in a manner similar to that used for diamond and cubic boron nitride recovery by dissolving the solvent medium in an acid such as sulphuric acid.

In another form of the method of producing the hard material according to the invention, the source of boron, nitrogen and carbon is transformed directly into the hard material by subjecting the source material to a pressure exceeding 120 kilobars and simultaneously a temperature exceeding 3000° C. This form of the method produces a polycrystalline mass of the hard material. The very onerous conditions of temperature and pressure are maintained only for a matter of micro seconds, but may be repeated several times to obtain suitable yields. Apparatus suitable for this form of the method is described and illustrated in U.S. Pat. No. 3,488,153. The source of boron, nitrogen and carbon may be hexagonal or amorphous boron carbonitride or a mixture of hexagonal boron nitride and graphite.

The invention is illustrated by the following non-limiting examples.

EXAMPLE 1

Individual, discrete particles of BCN in tetrahedral form and as illustrated by the accompanying drawing, were produced by the following method.

A crystalline boron carbonitride was produced by nitriding boron and carbon black in a nitrogen atmosphere at a temperature of about 1900° C. in the manner described in article 1 described above. This crystalline material was mixed with a powdered iron/aluminium alloy (10 parts by weight of iron to 1 part by weight of aluminium). The powdered mixture was placed in an iron cup and the cup wrapped in tantulum foil. The wrapped cup was placed in a high pressure capsule in a belt apparatus of the type described in U.S. Pat. No. 2,941,248, mentioned above. The contents of the capsule were then exposed to a pressure of 75 kilobars and a simultaneous temperature of about 1600° C. These elevated conditions of temperature were maintained for 40 minutes. The temperature was then allowed to return to ambient and the pressure released. The capsule was removed from the apparatus and its contents dissolved in dilute sulphuric acid. Crystals of BCN dropped out of the sulphuric acid gravimetrically. Single crystals of size up to 100 microns were recovered and these were identified as being BCN of the type illustrated by the accompanying drawing.

EXAMPLE 2

Boron carbonitride starting material, as used in Example 1 above, was placed into the reaction capsule of a high temperature/pressure apparatus of the type described in U.S. Pat. No. 3,488,153, mentioned above. This material was then subjected to a pressure of about 150 kilobars. A bank of condensers was discharged through the capsule to produce a temperature inside the capsule of very much greater than 3000° C. for a matter of micro seconds. The pressure was released and recovered from the capsule was a dark microcrystalline/polycrystalline material which analysed as BCN in tetrahedral form. This material scratched the soft direction of diamond.

We claim:

1. A hard material consisting essentially of $B_xC_yN_z$, wherein x, y and z can have any value greater than or equal to 1, in tetrahedral form.

2. A material according to claim 1 wherein x is equal to z and not equal to y.

3. A material according to claim 1 wherein x, y and z are all equal to 1.

4. A method of making a hard material which consists essentially of $B_xC_yN_z$,
   wherein x, y and z can have any value greater than or equal to 1, in tetrahedral form,
   including the step of subjecting as an appropriate source of boron, nitrogen and carbon a mixture of hexagonal boron nitride and graphite, or hexagonal or amorphous boron carbonitride to conditions of temperature and pressure sufficient to produce the material.

5. A method according to claim 4, wherein boron carbonitride, in hexagonal or amorphous form, in the presence of a solvent for boron carbonitride is subjected to elevated conditions of pressure and temperature to produce the material, the pressure exceeding 50 kilobars and the temperature exceeding 1300° C.

6. A method according to claim 5 wherein the pressure is in the range 50 to 100 kilobars and the temperature is in the range 1300° to 2000° C.

7. A method according to claim 6 wherein the elevated conditions of temperature and pressure are maintained for a period of 10 to 60 minutes.

8. A method according to claim 5 wherein the solvent is a mixture or alloy of a metal of Group 8 of the Periodic Table and aluminium.

9. A method according to claim 7 wherein the solvent is a mixture or alloy of a metal of Group 8 of the Periodic Table and aluminium.

10. A method according to claim 8 wherein the Group 8 metal is cobalt, nickel or iron.

11. A method according to claim 9 wherein the Group 8 metal is cobalt, nickel or iron.

12. A method according to claim 4 wherein the source of boron, nitrogen and carbon is subjected to a pressure exceeding 120 kilobars and simultaneously a temperature exceeding 3000° C. to produce the material.

* * * * *